Jan. 4, 1966     P. BAUER     3,226,931

FLUID DIAPHRAGM ISOLATOR

Filed Jan. 6, 1964

INVENTOR

PETER BAUER

BY *Griffin and Stokes*

ATTORNEYS

3,226,931
FLUID DIAPHRAGM ISOLATOR
Peter Bauer, Germantown, Md., assignor to Sperry Rand Corporation, New York, N.Y., a corporation of Delaware
Filed Jan. 6, 1964, Ser. No. 335,986
7 Claims. (Cl. 60—54.5)

This invention relates to means for transmitting transient changes in fluid signals while at the same time preventing steady state fluid flow.

With the recent advent of pure fluid amplification and logic systems, there has arisen the need for a pure fluid device with a function similar to that of a capacitor in electrical and electronic circuits. For example, one use of an electrical capacitor is to transmit A.C. components while blocking D.C. components. Electrical capacitors may be used in differentiating circuits to produce pulses from a step wave input. The present invention provides an analogous fluid means comprising in general a fluid chamber with two openings therein between which is stretched an elastic diaphragm, thereby providing two chamber portions sealed one from the other. The diaphragm is capable of flexure in the direction of a force differential thereacross, said differential being caused by a larger static pressure in one portion over that in the other. The diaphragm provides a tight seal to prevent fluids in the two different portions from intermingling. Thus, besides use as a fluid transient transmitter, the invention can also be used as an isolator to prevent mixing of different fluids, e.g., clean air and dirty air, yet still providing means whereby signals may be transmitted from one fluid to the other.

It is therefore one object of the present invention to provide a diaphragm fluid isolator structure whereby a change in the force exerted by fluid in one part of the system can be transmitted as a pulse signal to a different part of the system.

A further object of the invention is to provide a diaphragm isolator for preventing mixing of different fluids without impairing signal transmission therebetween.

These and other objects of the present invention will become apparent during the course of the following description to be read in view of the drawings, in which.

Figure 1:
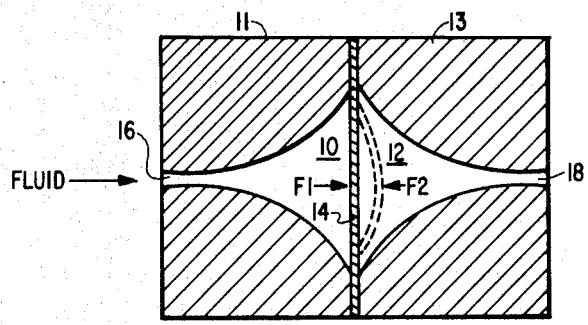
FIGURE 1 illustrates a preferred embodiment of the present invention.

FIGURE 1 shows a preferred embodiment of the invention which comprises a fluid chamber partitioned into two portions 10 and 12 by means of an elastic diaphragm 14. Each chamber portion 10 and 12 may be conveniently formed within respective bodies 11 and 13 made of fluid impervious material. Diaphragm 14 then is clamped between the outer flanges of bodies 11 and 13 so as to seal one portion 10 from the other portion 12 to prevent any fluid leakage therebetween. Chamber portion 10 has a fluid opening 16 while chamber portion 12 has a fluid opening 18. The walls of each chamber portion are gradually and symmetrically flared outwardly from its fluid opening, in the manner of the diverging section of the well known Venturi tube, so as to convert most, and ideally all, of the velocity head of any entering fluid stream to static head for application against diaphragm 14. This therefore prevents the kinetic energy of a moving fluid stream from substantially deflecting diaphragm 14 which in turn should only be responsive to the force exerted by static pressure in order that the device will act as a true fluid analog of an electrical capacitor. The cross sectional profile of the chamber taken perpendicular to the fluid flow axis may be of any shape, but preferably is rectangular where said device is used in a pure fluid system of laminar construction. For laminar construction only two opposed side walls of each chamber need be gradually flared as shown in FIGURE 1, since the top and bottom walls of the chamber are formed by parallel plates.

In an exemplary embodiment of this invention having particular utility as a fluid capacitance, the ratio of the separation between said opposed gradually diverging chamber side walls at either of said openings to their separation at the location of the diaphragm is greater than 1 to 10 and, more particularly, is approximately 1 to 14. This fluid expansion ratio is admirably suited to provide said conversion from velocity head to static head. However, somewhat smaller ratios may be employed without significantly affecting operation of the device in this area. The location of diaphragm 14 is also preferably equi-distant from openings 16 and 18 so as to help insure that the device will have the same operating characteristics for fluid flow in either direction, i.e., flow through opening 16 into portion 10 (as indicated by the arrow) or flow through opening 18 into portion 12. The actual distance between this diaphragm location and an opening depends of course upon the angle of side wall divergence and upon the desired ratio of side wall separation at the opening to that at the diaphragm location. This angle of wall divergence in turn should be gradual enough to prevent turbulence and voids in the fluid as it expands in cross sectional area. Although said chamber diverging walls could be made straight, as in the typical Venturi tube, they preferably are gradually and smoothly flared outwardly at an ever increasing angle such that each forms a continuous curved surface from an opening 16 or 18 to diaphragm 14. In this way the distance can be reduced between the diaphragm 14 and each opening without decreasing the preferred fluid expansion ratios described above. Consequently, the overall length of the illustrated device can be made less than one with straight diverging walls. This is a useful and important feature in miniaturized pure fluid systems where space is at a premium. In the exemplary embodiment which has already been partially described above, said distance from each opening to the diaphragm is approximately ten times the separation of the diverging walls measured at said openings, and the radius of wall curvature is also approximately ten times this said separation.

The volumes of the isolated chamber portions 10 and 12 should also preferably be equal when diaphram 14 is unflexed. This is especially desirable when the device is utilized as a capacitor connected in a fluid differentiating or integrating circuit, inasmuch as fluid flow will occur both into and out of each chamber portion during different times of the operating cycle as will be described below. In this respect the device should be analogous to an electrical capacitor having the same operating characteristics no mattter which of its plates is charged positive (or negative). Furthermore, the cross sectional flow areas of openings 16 and 18 should also be equal in order to help insure the identity of fluid flow characteristics for either direction when the device is utilized as a capacitor. Other features of the preferred embodiment include a co-axial alignment of the openings 16 and 18, and the symmetrical arrangement of the chamber walls about a center line connecting said two openings.

Since diaphragm 14 is elastic, it is distorted only when a force differential other than zero is applied thereacross or, in other words, when a force F1 in portion 10 and a force F2 in portion 12 are unequal. If the force differential is zero, then the diaphragm is in the center solid line position shown in FIGURE 1 which may be thought of as analogous to the state of an electrical capacitor having a zero potential difference thereacross due to the fact that each of its plates has the same number of electrons thereon. By now increasing the density of fluid particles in one chamber portion over that in the other (as, for example, by admitting fluid to volume 10), the static pressure therein increases to produce a net force differential other than zero tending to distort diaphragm 14 in the manner shown by its dotted outline position. Although this distorting force is opposed to some extent by the elastic force of return within diaphragm 14, the diaphragm will stretch until the static pressure in volume 12 plus the elastic force of return within the diaphragm itself equals the increased static pressure in chamber 10. The static pressure in chamber 12 increases if opening 18 is blocked so that no particles of fluid escape when its effective volume is reduced by flexure of diaphragm 14. If opening 18 is unblocked, then some fluid particles escape, but the distortion in diaphragm 14 also increases its elastic force of return so that the force differential thereacross eventually reduces to zero assuming that a puncture condition is not allowed to prevail. When the structure of FIGURE 1 is charged with fluid on one side of the diaphragm so that said diaphragm is stretched out of its normal shape, its condition is analogous, with respect to the storage of fluid energy, to the condition of an electrical capacitor which is charged to some potential difference between its plates.

Figure 3:
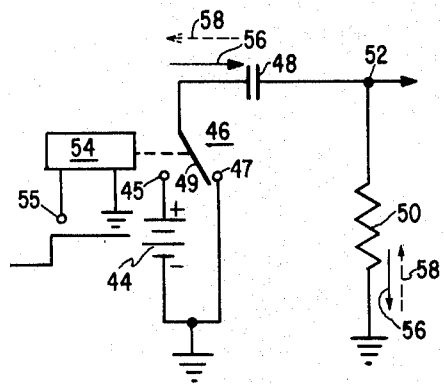
FIGURE 3 is a schematic of an electrical differentiating circuit which may be useful in understanding the operation of FIGURE 2.
Figure 2:
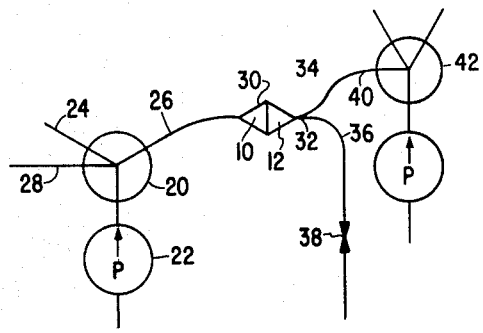
FIGURE 2 is a schematic of a fluid differentiating circuit wherein the present invention finds particular use.

FIGURE 2 illustrates how the novel device of FIGURE 1 may be used in a fluid differentiating circuit which is analogous to the electrical differentiating circuit shown in FIGURE 3. In FIGURE 2, a pure fluid amplifier 20 is supplied with a fluid power stream from a pump source 22. Fluid amplifier 20 has two output channels 24 and 26 through either one of which the power stream selectively flows according to the absence or presence, respectively of a fluid control signal at input 28. Output channel 24 exhausts to some base reference pressure (such as the atmosphere where the fluid is air), while output channel 26 is connected to an input opening 16 of the novel device 30 such as the one shown in FIGURE 1. The opposite opening 18 of the device 30 is connected to a channel 32 which branches into two channels 34 and 36. Channel 36 includes a restriction 38 and exhausts back to the base reference pressure here assumed to be atmospheric. Restriction 38 is representative of the resistance to fluid flow through the channel. The other channel 34 may be connected to a control input channel 40 of a second pure fluid amplifier 42.

Before explaining the operation of the novel device 30 in the circuit of FIGURE 2, it appears advantageous to first investigate the analogous electrical circuit of FIGURE 3. A source of potential E, for example battery 44, is connected with its negative terminal to circuit ground and its positive terminal to one contact 45 of a switch 46. The other contact 47 of switch 46 is connected directly to ground, with the movable switch armature connected through a resistor 50 back to ground. The junction 52 between capacitor 48 and resistor 50 may be connected to the control electrode of any well known element such as a vacuum tube or transistor. The armature 49 of switch 46 is selectively moved to connect either with the positive terminal of battery 44 or with ground. This selective positioning of switch 46 may be conveniently accomplished through use of a relay 54. The relay may be biased so that in the absence of a positive signal applied to its input terminal 55, armature 49 is positioned to bear against contact 47 and so connect ground to the left plate of capacitor 48. The application of a positive signal to terminal 55 of relay 54 moves the switch armature 49 to connect the positive terminal of battery 44 to capacitor 48.

Figure 4:
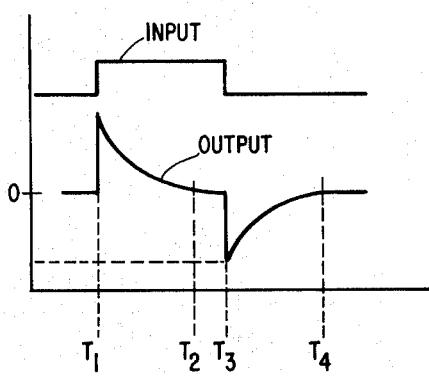
FIGURE 4 is a graph illustrating the input and output wave forms which are generally common to the circuits of FIGURES 2 and 3.

Assuming that armature 46 is initially against contact 47 so that the left and right plates of capacitor 48 are both at ground potential with a steady state condition prevailing, the operation of FIGURE 3 will be briefly described beginning with the receipt of a positive step wave signal to relay 54. This moves the armature 49 to the left so as to apply the battery potential across the series combination of capacitor 48 and resistor 50. FIGURE 4 illustrates the signal step wave form input to relay 54 as it varies with time, while also indicating the output wave form appearing at junction 52. If armature 46 is connected with battery 44 at time T1, conventional current flow commences in the direction of arrows 56. This current is maximum at time T1 and raises the potential at junction 52 to a value above ground. Since there is no potential difference across the capacitor at the beginning of this charging operation, the voltage at junction 52, referred to ground, is a fact equal to the battery potential E if resistance of the current is considered negligible except for that represented by resistor 50. However, this maximum current flow immediately begins to decay after time T1 as the charge across capacitor 48 builds up in a direction to buck the battery potential E. The output wave form decreases from its maximum positive value E along an exponential curve until such time T2 that capacitor 48 is charged to the battery potential whereupon current flow ceases so that the potential at junction 52 is once again at ground. It will thus be seen that although the input to relay 54 is a step wave signal, the output at junuction 52 is a short positive pulse occurring between times T1 and T2. The input signal can remain after time T2 without there being any further change in the potential of junction 52. When the input signal is finally terminated, as for example at time T3, armature 46 moves to connect the left plate of capacitor 48 to ground. This causes a discharge of the capacitor so that conventional current flows through the circuit in the direction of the dotted arrows 58 until such time that the potential difference across the capacitor is reduced to zero. At time T3 this discharging current is maximum since the charge across the capacitor is maximum at this time. This maximum reverse current flow through resistor 50 therefore immediately drops junction 52 to a negative potential E below ground. As the potential difference across capacitor 48 decreases, due to the transfer of electrons from the left plate to the right plate, this current decays until such time T4 when capacitor 48 has zero potential difference thereacross. As the discharge current through resistor 50 decays, the potential at junction 52 returns toward ground in the manner shown. When the capacitor is entirely discharged, no more current flows through resistor 50 and junction 52 is once again at ground potential. From the above it will be seen that in a typical capacitor-resistor series charging circuit across which a positive step input wave form is applied, the output at junction 52 takes the form of a transient positive going pulse commencing at the time T1 that the leading edge of the input signal appears, and a transient negative going pulse commencing at the time T3 that the trailing edge of the input signal appears. This circuit in effect differentiates the input signal if its parameters are adjusted so that the positive going and negative going output pulses are quite narrow so as to reflect the abrupt slope change of the input wave form from zero to infinity, and vice versa.

Referring once again to fluid circuit of FIGURE 2, it will next be shown that a pulse type output pressure wave form appears in channel 32 when a step wave fluid signal is applied to channel 28. For the purposes of this discussion, pump 22 is considered to be equivalent to battery 44, fluid amplifier 20 to relay 54 and switch 46, device 30 to capacitor 48 and restriction 38 to resistor 50. The base reference pressure is equivalent to ground of FIGURE 3. Furthermore, the resistance of channel 26 to fluid flow should ideally be equal to zero such that there is a complete and instantaneous filling of chamber 10 with fluid at the time when the power stream of amplifier 20 is deflected into channel 26. This ideal case would mean that the static pressure in chamber 10 immediately rises to the value of the pump 22 discharge pressure in order to maintain the analogy between the fluid system and the electrical circuit of FIGURE 3 wherein the left plate of capacitor 48 was assumed to immediately rise to potential E of battery when armature 49 is thrown to the left. Assume initially that no fluid input is applied to control channel 28 of fluid amplifier 20. For this condition the power stream in said amplifier exhausts through output channel 24 into the atmosphere. This causes entrainment of fluid in output channel 26 which in turn reduces the pressure therein to a value near, if not equal, to atmospheric pressure. Atmospheric pressure is thus applied to both sides of the elastic diaphragm 14 which therefore remains unflexed. For this steady state condition, the status of the FIGURE 2 circuit is then similar to the circuit of FIGURE 3 when armature 49 is connected to ground. Now assume that a step wave fluid signal is applied to channel 28 of fluid amplifier 20 such that its power stream is deflected to channel 26 at time T1 of FIGURE 4. The static pressure in chamber 10 of device 30 immediately rises to equal the discharge pressure of pump 22 at time T1. Diaphragm 14 is thereupon flexed so as to reduce the volume of chamber 12 of device 30 which in turn acts to force the fluid particles therein through opening 18, channel 32, and channel 36 to the atmosphere. However, due to the finite size of these fluid channels which offers resistance to unlimited fluid flow (as represented by restriction 38), the fluid mass in chamber 12 cannot be reduced instantaneously at time T1. Consequently, the static pressure in chamber 12 immediately increases at time T1 with respect to atmospheric pressure because of this compression, i.e., the reduction in the volume of chamber 12 without a proportional change in its fluid mass. This increased pressure is communicated as a pressure pulse to fluid amplifier 42 via channel 34. Immediately after time T1, the fluid mass in chamber 12 begins to be reduced because of flow through channels 32 and 36, thus reducing the static pressure from the value at T1 down to atmospheric pressure at time T2. A transient positive going pressure pulse has thus been generated commencing at the leading edge of the fluid input control signal to amplifier 20.

Now assume that the signal at input 28 disappears at time T3 so as to switch the power stream back into output channel 24. This entrains fluid from channel 26 (and thus chamber 10) so as to reduce the pressure in chamber 10 back to atmospheric. If this reduction is assumed to be instantaneous because of the absence of any significant fluid resistance in line 26, then the elasticity of diaphragm 14 returns said diaphragm to the left. This suddenly increases the volume of chamber 12 at time T3 which in turn reduces the density of fluid therein because of the resistance to unlimited fluid flow through restriction 38. Consequently, the static pressure in chamber 12 abruptly decreases below atmospheric at time T3. A reverse fluid flow commences at time T3 through channels 36 and 32 so as to increase the fluid mass in chamber 12 to a value whereupon the pressure therein once again becomes equal to atmospheric pressure. Consequently a transient negative going pressure pulse, commencing at the trailing edge of the input signal, is communicated to output channel 34.

FIGURE 2 shows but one of many uses for the novel device of FIGURE 1. Other uses may be found in systems wherein isolation is required to prevent mixing between different fluids, e.g. clean air and dirty air, during the transfer of signals therethrough. The device further can be used to permit hot-wire transient measurements without swamping by steady state flow. Although one preferred embodiment has been shown and described, modifications to same may be made by those skilled in the art without departure from the spirit of the invention as defined in the appended claims.

The embodiments of the invention in which an exclusive property or privilege is claimed are defined as follows:

1. A fluid device for transmitting changes in fluid pressure while at the same time preventing steady state fluid flow, which comprises:
  (a) a fluid chamber having a first opening at one end thereof and a second opening at the opposite end thereof, with at least one pair of opposed chamber side walls being gradually and smoothly flared outwardly at an ever increasing angle from the edge of each said opening towards a location between said openings such that the velocity pressure head of moving fluid entering through either opening is substantially converted to static pressure head at said location; and
  (b) a diaphragm member placed across said chamber at said location to seal off said first opening from fluid communication with said second opening and thereby provide first and second isolated chamber portions, with said diaphragm member being capable of flexure toward either openings in response to a pressure differential thereacross.

2. A fluid device for transmitting changes in fluid pressure while at the same time preventing steady state fluid flow, which comprises:
  (a) a fluid chamber having coaxially aligned first and second openings at opposite ends thereof, with at least one pair of opposed chamber side walls being gradually and smoothly flared outwardly at an ever increasing angle from the edge of each said opening to a location between and equi-distant from said openings such that the velocity pressure head of moving fluid entering through either opening is substantially converted to static pressure at said location; and
  (b) a diaphragm member placed across said chamber at said location to seal off said first opening from fluid communication with said second opening and thereby provide first and second isolated chamber portions, with said diaphragm member being capable of flexure toward either opening in response to a pressure differential thereacross.

3. A fluid device according to claim 2 wherein the divergence of said opposed side walls is symmetrical about a chamber center line connecting said first and second openings.

4. A fluid device according to claim 2 wherein the volumes of said first and second chamber portions are equal when said diaphragm member is unflexed.

5. A fluid device according to claim 4 wherein said first and second openings have equal cross-sectional flow areas.

6. A fluid device according to claim 5 wherein the ratio of the separation between said opposed diverging chamber side walls at said openings to their separation at said diaphragm location is greater than 1 to 10.

7. A fluid device according to claim 5 wherein the divergence of said opposed side walls is symmetrical about a chamber center line connecting said first and second openings.

References Cited by the Examiner
UNITED STATES PATENTS

| | | | |
|---|---|---|---|
| Re. 14,738 | 10/1919 | Constantinesco | 60—54.5 |
| 1,643,574 | 9/1927 | Breland | 60—54.5 |
| 1,804,599 | 5/1931 | Edel | 92—95 |
| 1,986,764 | 1/1935 | Rhodes | 60—54.5 |
| 2,317,594 | 4/1943 | Ericson | 60—54.5 |
| 2,667,184 | 1/1954 | Hailer et al. | 92—98 |
| 2,907,339 | 10/1959 | Reinecke et al. | 92—98 X |
| 3,075,468 | 1/1963 | Eifel. | |

SAMUEL LEVINE, *Primary Examiner.*

RICHARD B. WILKINSON, *Examiner.*

H. G. SHIELDS, I. C. COHEN, *Assistant Examiners.*